United States Patent Office 3,333,931
Patented Aug. 1, 1967

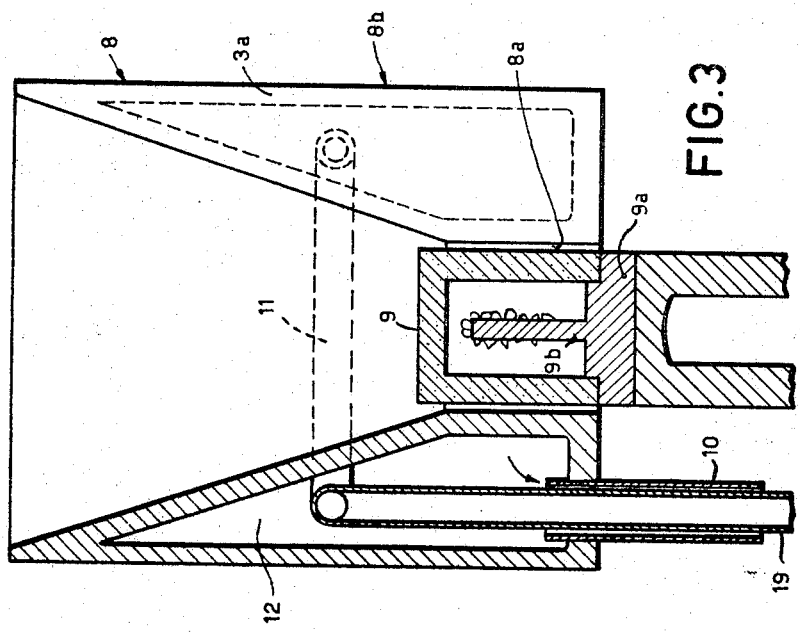
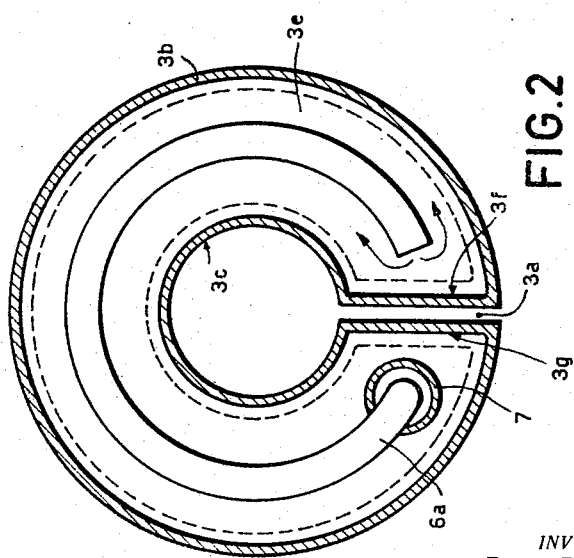

3,333,931
PROCESS FOR THE PRODUCTION OF MONO-
CRYSTALS OF URANIUM CARBIDE
Pierre Beucherie, Biandronno, Varese, and Joseph Gerard
Wurm, Varese, Italy, assignors to European Atomic
Energy Community—Euratom, Brussels, Belgium
Filed June 10, 1963, Ser. No. 286,699
Claims priority, application Germany, June 15, 1962,
E 23,036
2 Claims. (Cl. 23—349)

This invention relates to a process for the production of monocrystals of nuclear materials with metallic components, in particular of ceramic nuclear fuels, in high vacuum, by electrothermic vaporization of the material in a chamber formed within the body of the material and subsequent sublimation of the vapours on portions of the chamber wall which are kept at a lower temperature. $UO_2$ monocrystals of up to 12 mm. length have already been obtained by means of such a process; vide "Journal of Nuclear Materials" 1962, No. 2. A hollow cylindrical $UO_2$ body is connected with its face portions between two electrodes. It is then preheated by means of special electrical heat conductors and is thus rendered sufficiently conductive of electricity. Current is then passed through the body from the electrodes. The $UO_2$ vapours produced in the interior of the cylindrical body are deposited on the cooler electrodes and form thereby the desired monocrystals.

It is the object of the invention to produce primarily UC monocrystals, particularly by means of sublimation in a vapourizing chamber of the UC body.

In contrast with $UO_2$, however, the vapour pressure of UC is very low. In addition the UC vapour can only be used for sublimation in the vicinity of the melting point of UC. This means that when the nuclear body is heated by direct conduction of current through electrodes, the following difficulties are met:

(1) The required contact pressure of the electrode cannot be withstood mechanically by the nuclear body since the temperature is very close to the melting temperature.

(2) It is exceptionaly difficult to ensure the setting of the current strength in the UC body to a value at which no melting occurs.

A way has been found, in accordance with the invention of overcoming these difficulties in a relatively simple manner and, as shown in practice, with success. The invention consists in that the vapourizing energy is supplied inductively at high frequency to the walls of the body, with the exception of the sublimation surfaces, and a field concentrator is provided between the nuclear body and the induction winding.

In this way all the problems connected with the conduction of current are solved, which means that the process is universally applicable. Further advantages are provided by the constructional characteristics of the sublimation means, as hereinafter described, in particular with regard to the accessibility of the sublimation surfaces, the extensibility of the dimensions of the nuclear body and the maintenance of vacuum in the apparatus.

An embodiment of the invention is shown schematically in the accompanying drawing in which:

FIG. 2 is a cross-section through the field concentrator.

FIG. 3 is a longitudinal section of the field concentrator and of the nuclear body in a form modified in respect of that of FIG. 1.

Figure 1:
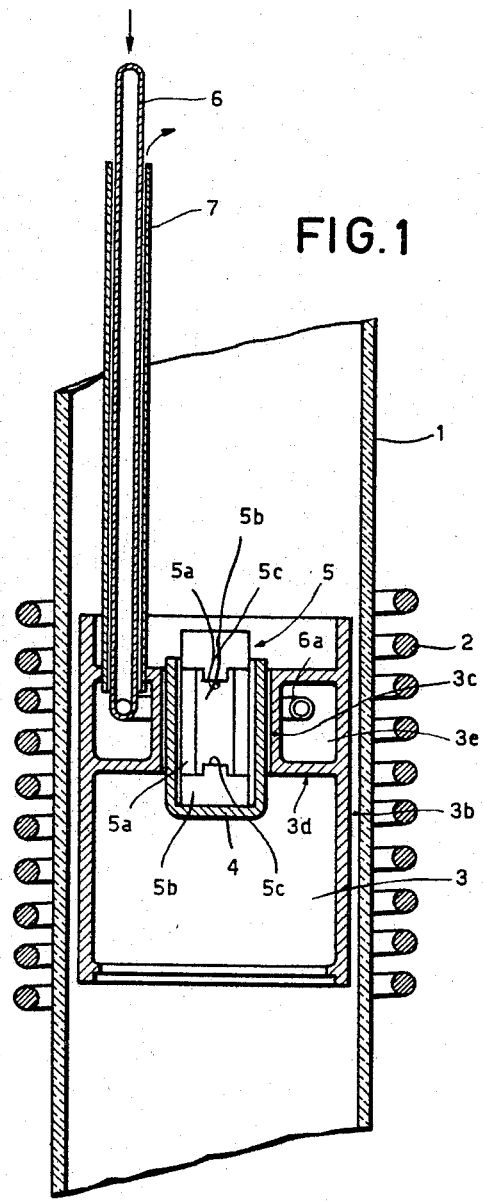
FIG. 1 is a longitudinal section of the apparatus with the induction winding, the field concentrator and the nuclear body.

In FIG. 1 the numeral 1 indicates the high vacuum vessel, a quartz tube of 6 cm. diameter which is sealed at the top (not shown) and is connected at the bottom (not shown) with a branch pipe for the vacuum pump; numeral 2 indicates the induction winding which is connected to a 1.5 mHz.-generator with a heat yield of 5 kw.; element 3 is the field concentrator, a double cylindrical element of copper with a radial slot 3a (FIG. 2) leading from the outer to the inner cylindrical surface; numeral 4 indicates a carrier vessel of BeO; 5 is the actual nuclear body of UC and 6 and 7 are concentric cooling medium inlet and outlet pipes.

In accordance with the invention the vapourizing energy for the nuclear body is supplied inductively at high frequency to the walls of the body with the exception of the sublimation surfaces further described in detail hereunder, the cooled field concentrator 3 being mounted between the nuclear body 5 and the induction winding 2. The annular currents produced in the nuclear body move primarily, in view of the skin effect, along the outer cylindrical surface of the body, so that the wall remains mechanically stable. This outwardly directed temperature gradient has the additional advantage of diffusing outwardly any more volatile impurities in the nuclear body.

The field concentrator, as also shown in FIG. 2 has a cylindrical outer wall 3b, a cylindrical inner wall 3c, cross partitions 3d and included therebetween an annular hollow space 3e which constitutes the cooling chamber. The field concentrator is in transformer circuit with the induction winding 2. The outer wall 3b substantially sweeps the induction winding 2 and therefore extends over the entire length thereof. The inner wall 3c feeds the nuclear body and therefore it extends no further than the longitudinal dimension of the same. As clearly shown in FIG. 2, due to the radial longitudinal slot 3a, the induction current flows in the field concentrator from the outer wall 3d along the slot and into the cylindrical inner wall 3c closing the circuit therein, as shown by the dotted line in FIG. 2. The HF-field energy is thus localized and concentrated and is fed in this condition into the wall of the nuclear body.

The cooling chamber 3e of the field concentrator is supplied with water through the conduit 6 and the elbow 6a connected therewith. The elbow has its open end facing the cross wall 3f of the radial slot. It is at this point that the cooling water enters the hollow chamber. From there the water flows back to the outlet pipe 7 which opens into the hollow space in the vicinity of the other cross wall 3g. This manner of supplying the water avoids the annular short circuits of the secondary field in the cooling medium.

The cooling medium does not only keep cool the field concentrator itself. On the one side it cools the outer wall of the BeO crucible, and on the other side it thermally protects the quartz tube 1. The whole apparatus is practically cold, this being of great operational advantage, especially for the vacuum plant.

The nuclear body 5 consists of a cylindrical middle portion 5a and two loose covers 5b provided with sublimation surfaces 5c. The space 5b is the vapourizing chamber. The space is made from a solid body, that is a cylindrical chamber is bored by ultrasonic waves from an initially full cylindrical UC body. The dimensions of the body are 12 mm. outer diameter, 8 mm. chamber diameter and 20 mm. height.

As clearly shown in FIG. 1, the covers 5b are located beyond the inductive heating area. Thus they remain substantially cooler than the middle portion 5a and effect the sublimation of the vapours on the surfaces 5c.

The mentioned BeO carrier vessel 4 serves not only to hold the UC body and to protect the apparatus from damage but also to insulate thermally the nuclear body. The temperature in the vapourizing zone of the UC body is approximately 2200° C. The vacuum in the quartz tube is kept below $10^{-6}$ mm. Hg.

Instead of the field concentrator and nuclear body shown in FIG. 1, the modified embodiment of FIG. 3 may be used.

According to FIG. 3 the field concentrator 8 is in the shape of a funnel. Its inner cylindrical casing surface 8a corresponds at top and bottom with the UC nuclear body 9. Scattering of energy, especially downwards, is thus avoided. At the top the inner casing surface connects with the outer casing surface 8b at the constant funnel angle. As a whole therefore the scatter edges are avoided as compared with the construction according to FIG. 1. The pipes 19 and 10, with the elbow 11 and the hollow space 12 form the cooling system which is herein fed from the bottom.

The nuclear body 9 is in the form of a pot with its opening directed downwardly and fitting on a cover-like support 9a provided with a pin 9b. The support and the pin consist of a highly refractory material, for example wolframite. On the pin, which constitutes the actual sublimation surface, there is provided a layer of UC monocrystals. These are seed crystals which simulate the formation of crystals by sublimation at larger initial dimensions. The support and the pin may additionally be cooled by internal flushing with water.

The UC monocrystals produced by the process according to the invention exhibit for the most part a very regular shape. When no seeding crystals are used, the crystal dimensions are of the order of $\frac{1}{10}$ mm.

I claim:

1. Process for the production of uranium carbide monocrystals, comprising electrothermally vapourizing the carbide in high vacuum in a chamber of which the walls are at least in part formed by a body consisting of the carbide, the vapourizing energy being supplied inductively at high frequency and with field concentration to the walls of said body, and sublimating the vapours on chamber wall portions which are kept at a lower temperature, and to which no vapourizing energy is supplied.

2. A process as recited in claim 1, wherein the cover of the chamber is made of wolframite.

References Cited

UNITED STATES PATENTS

| | | | |
|---|---|---|---|
| 2,797,289 | 6/1957 | Georgen | 219—10.57 |
| 2,807,698 | 9/1957 | Pircon | 219—10.57 |
| 3,046,090 | 7/1962 | Powers | 23—14.5 |
| 3,123,435 | 3/1964 | Miller et al. | 23—14.5 |

L. DEWAYNE RUTLEDGE, *Primary Examiner.*

CARL D. QUARFORTH, BENJAMIN F. PADGETT,
*Examiners.*

R. L. GRUDZIECKI, S. TRAUB, *Assistant Examiners.*